United States Patent Office 3,527,739
Patented Sept. 8, 1970

3,527,739
VULCANIZABLE COPOLYMERS OF ETHYLENE, HIGHER ALPHA-OLEFINS AND A 5-ALKADIEN-YL-2-NORBORNENE, AND PROCESS FOR PRODUCING SAME
Alberto Valvassori and Nazzareno Cameli, Milan, Italy, and Guido Sartori, Brussels, Belgium, assignors to Montecatini Edison S.p.A., Milan, Italy, a corporation of Italy
No Drawing. Filed Apr. 11, 1968, Ser. No. 720,466
Claims priority, application Italy, Apr. 12, 1967, 14,837/67, Patent No. 793,304
Int. Cl. C08f *15/40*
U.S. Cl. 260—80.78
19 Claims

ABSTRACT OF THE DISCLOSURE

Modified Natta et al. linear, amorphous, elastomeric copolymers of ethylene and a higher alpha-olefin which are readily sulfur-vulcanizable are obtained by copolymerizing the ethylene and higher alpha-olefin with a 5-alkadienyl-2-norbornene whereby randomly distributed unsaturations are introduced into the copolymer macromolecules.

---

As indicated by the abstract, this invention relates to a particular class of unsaturated and vulcanizable, substantially linear, amorphous, high molecular weight, elastomeric copolymers, and to a process for the preparation thereof.

Amorphous, linear, high molecular weight copolymers of ethylene and higher alpha-olefins, in particular propylene or butene-1 have been disclosed by Natta et al. Said copolymers have very good elastomeric characteristics, as well as good resistance to ageing and chemical agents, and have interesting practical applications.

It was apparent that, since Natta et al. copolymers are saturated, curing or vulcanization thereof by means of conventional mixes comprising sulfur and accelerating agents could be facilitated by copolymerizing the ethylene and higher alpha-olefin in the presence of a third monomer copolymerizable therewith and containing more than the one carbon-to-carbon double bond which is used in the copolymerization, to thus obtain macromolecules made up of units of ethylene, units of the higher alpha-olefin, and units of the third monomer, which latter units contain a residual double bond.

The elastomeric characteristics of the final terpolymers, and of vulcanizates thereof obtained by curing the terpolymers by means of the conventional sulfur-based mixes, such as those commonly used for the vulcanization of butyl rubber, are due to the presence in the macromolecules of the ethylene and higher alpha-olefin units in the particular arrangement resulting in the amorphous macromolecules. The third monomer used to introduce sites of unsaturation into the copolymer macromolecular main chain does not alter the elastomeric characteristics.

Linear and cyclic conjugated and non-conjugated polyenic hydrocarbons have been suggested for the use as the third monomer. In particular, it has been proposed to use, as the third monomer, a diolefin of the endomethylene type, such as methylenenorbornene and alkenylnorbornenes.

One object of the present invention was to provide new ethylene/higher alpha-olefin copolymers modified by the presence in the copolymer macromolecules of units of a third monomer containing unsaturations and which, at like contents of the third monomer, would yield vulcanizates having mechanical characteristics which are improved as compared to those of the vulcanizates of the copolymers in which the third monomer is an endomethylene diolefin.

This and other objects are accomplished according to this invention, by using, as modifier of the amorphous, elastomeric ethylene/higher alpha-olefin copolymers, a 5-alkadienyl-2-norbornene having the general formula

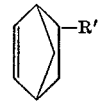

in which R' is a non-conjugated alkadienyl containing from 5 to 9 carbon atoms.

As termonomers for introducing unsaturations into the amorphous, saturated ethylene/higher alpha-olefin copolymers, the alkadienylnorbornenes have advantages over endomethylene diolefins, especially the methylenenorbornene and alkenylnorbornene suggested previously. In fact, comparing terpolymers according to this invention, and the vulcanizates thereof, with those in which the termonomer is methylenenorbornene or an alkenylnorbornene, it is found that when the molar content of the termonomer is the same, the present terpolymers contain a larger number of unsaturations and the vulcanizates thereof have better mechanical properties, a result which is wholly unexpected since it would have been expected that the presence of three double bonds in the alkadienylnorbornenes would promote undesired side reactions such as cross-linking.

On the contrary, the copolymers of this invention are substantially linear, i.e., these copolymers are substantially free of long branches and cross-links. This is demonstrated by the fact that properties of these copolymers, such as, for instance, the viscous behavior, are practically identical with those of the ethylene/higher alpha-olefin copolymers that are known to be linear.

Examples of the alkadienylnorbornenes which can be used as termonomer in the production of the present modified amorphous ethylene/higher-olefin copolymers include:

5-(3-methyl-1,4-pentadienyl)-2-norbornene
5-(1,5-hexadienyl)-2-norbornene
5-(1,4-hexadienyl)-2-norbornene
5-(3,7-octadienyl)-2-norbornene These alkadienylnorbornenes can be prepared readily by reacting cyclopentadiene with an alkatriene.

The higher alpha-olefins at least one of which is copolymerized with ethylene and at least one of the alkadienylnorbornenes to obtain the present copolymers have the general formula R—CH=CH$_2$ in which R is an alkyl group containing from 1 to 6 carbon atoms. Propylene and butene-1 are presently preferred.

The copolymerizate consists of macromolecules having randomly distributed therein units deriving from all of the starting monomers.

The copolymers have molecular weights higher than 20,000, as determined by viscosity measurements, the intrinsic viscosity in tetrahydronaphthalene at 135° C., or in toluene at 30° C., being higher than 0.5.

That the copolymers have a homogeneous composition is evidenced by the fact well-vulcanized elastomers or synthetic rubbers can be obtained by vulcanizing the copolymers by means of the conventional mixes based on sulfur and accelerating agents. This also demonstrates that the unsaturations introduced into the macromolecules in the units deriving from the alkadienylnorbornenes are well-distributed along the macromolecular main chains. The vulcanizates are characterized by very good mechanical resistance and by good values of permanent sets after breaking.

The good mechanical characteristics adapt the elastomers obtained by the vulcanization to use for all the purposes for which natural and synthetic rubbers are used, such as in the manufacture of tires, pipes, inner tubes, elastic threads, gaskets, etc. Such articles can be made by the known methods for the shaping of a mass comprising natural or synthetic rubbers.

The present copolymers can be extended or plasticized with hydrocarbon oils. Preferably, paraffinic or naphthenic oils are used as extenders or plasticizers; however, aromatic oils may also be used.

Catalytic systems which can be used to produce the present copolymers are prepared from vanadium compounds and organo compounds of hydrides of aluminum.

The organometallic compounds and hydrides of aluminum which are used as one catalyst-forming component are selected from aluminum trialkyls, aluminum dialkyl monohalides, aluminum monoalkyl dihalides, aluminum alkylsesquihalides, aluminum alkenyls, aluminum alkylenes, aluminum cycloalkylalks, aluminum alkyl-hydrides, aluminum halo-hydrides, and complexes of the aforementioned organometallic compounds of aluminum with Lewis bases, preferably weak Lewis bases, by which is meant Lewis bases having a heat of complexation with an organometallic compound of less than 12,000 cal./mol. The organometallic compound of aluminum may also be one in which the metal is linked, by main valances, not only to carbon and/or halogen atoms but also to oxygen atoms bound to an organic group, such as aluminum dialkylalkoxides, and aluminum alkylalkoxyhalides.

Specific organometallic compounds and hydrides of aluminum which can be employed as one component of the useful catalytic systems include aluminum tri(dimethylcyclopentylmethyl), aluminum diethylamyloxide, aluminum triethyl, aluminum diisobutyl, aluminum triisobutyl, aluminum ethyldichloride, aluminum trihexyl, aluminum ethylsesquichloride, aluminum diethylchloride, aluminum butenyldiethyl, aluminum diethyliodide, aluminum isohexenyldiethyl, aluminum diethylfluoride, aluminum triphenyl, aluminum diphenylchloride, aluminum chlorotheyl ethoxide, aluminum diethylpropoxide, aluminum chloropropylpropoxide.

The vanadium compounds used as one catalyst-forming component are preferably those compounds of vanadium which are soluble in the hydrocarbon solvents which can be used as the inert copolymerization solvent of diluent, and which are aliphatic, cycloaliphatic or aromatic hydrocarbon solvents, and include vanadium halides and oxyhalides such as, for instance, $VCl_4$, $VOCl_3$, $VBr_4$, and compounds in which at least one of the vanadium valences is satisfied by a heteroatom (oxygen or nitrogen) bonded to an organic group, such as vanadium triacetylacetonate, vanadium tribenzoylacetonate, vanadyl diacetylacetonate, vanadyl haloacetylacetonates, trialcoholates, and halo-alcoholates, tetrahydrofuranates, etherates, aminates, pyridinates, and quinolates of vanadium tri- and tetrachloride and vanadyl trichloride.

Certain hydrocarbon-insoluble vanadium compounds, which are organic salts of the metal, such as vanadium triacetate, tribenzoate, and tristearate as well as certain inorganic vanadium compounds such as $VOCl_2$, can also be used.

In practice, it has been found advisable to use catalytic systems containing halogen, that is, systems of which at least one of the starting components is halogenated.

The copolymerization can be carried out at temperatures ranging from −80° C. to +125° C. When the aluminum-containing catalyst component is an aluminum alkyl halide, the highest copolymer yields per weight unit of catalyst employed are obtained when both the catalyst preparation and the copolymerization are carried out at temperatures ranging from 0° to −80° C., preferably from −10° to −50° C., because under these conditions the catalysts are much more active than are the same catalytic systems prepared and used at higher temperatures. In addition, at the temperatures in the range −10° C. to −80° C., the activity of the catalysts remains practically unchanged with time.

When using catalysts prepared from aluminum alkyhalides and vanadium compounds of the type of vanadium triacetylacetonate, vanadyl trialcoholates, or halogen alcoholates, at temperatures in the range 0° C. to 125° C., the highest copolymer yields are obtained by also using special complexing agents selected from ethers, thioethers, tertiary amines, and trisubstituted phosphines containing at least one branched alkyl group or an aromatic nucleus. The amount of complexing agent is preferably from 0.05 to 1.0 mole per mole of aluminum alkylhalide.

The molar ratio of the catalyst-forming components influences the activity of the catalyst system. For example, when aluminum trialkyls and vanadium halides or oxyhalides are employed, the most active catalysts are obtained when the molar ratio of aluminum trialkyl to vanadium compound is 1 to 5, preferably 2 to 4. On the other hand, if aluminum diethylchloride and vanadium triacetylacetonate ($VAc_3$) are used, the most active catalysts are obtained at aluminum diethylchloride to $VAc_3$ molar ratios of 2 to 20, preferably 4 to 10.

The copolymerization can be carried out in a hydrocarbon solvent which can be an alkane, cycloalkane, or arene. Suitable solvents include butane, pentane, n-heptane, cyclohexane, toluene, xylene and mixtures thereof. inert halogenated hydrocarbon solvents can also be used. These include chloroform, trichlorethylene, chlorobenzenes, tetrachloroethylene, methylene chloride, dichloroethane, and the like solvents inert to the catalyst.

Extraneous diluents may be dispensed with, and the copolymerization carried out with the monomers maintained in the liquid state, that is in a solution of ethylene in the mixture of the higher alpha-olefins and alkadienylnorbornenes to be copolymerized with it. The solution state can be maintained by any suitable or necessary measures. Particularly hilgh copolymerization rates are obtained by this embodiment of the invention, in which extraneous inert solvents or diluents are not used and the liquid monomers serve as the copolymerization medium.

In order to obtain copolymers of homogeneous composition, the ratio between the concentrations of the monomers has to be maintained constant, or at least as nearly constant as is possible in practice. To this end, it may be advisable to effect the copolymerization on a continuous basis, by continuously feeding and discharging a monomer mixture having constant composition, and by operating at high spatial rates, that is at high feeding and discharging rates.

The composition of the copolymers can be varied by varying the composition of the mixture of monomers.

When amphorous copolymers of the alkadienylnorbornenes with ethylene and propylene are desired, the molar ratio of propylene to ethylene maintained in the reacting liquid phase must be at least 4:1. This corresponds to a propylene/ethylene molar ratio in the gas phase, under normal conditions, of at least 1:1. Propylene to ethylene molar ratios of 200:1 to 4:1 in the liquid phase are normally preferred.

When the higher alpha-olefin is butene-1, instead of propylene, the butene-1/ethylene molar ratio maintained in the reacting liquid phase must be at least 20:1, in order to obtain amorphous copolymers. This corresponds to a butene-1/ethylene molar ratio in the gas phase, under normal conditions, at least 1.5:1. Butene-1/ethylene molar ratios of from 1000:1 to 20:1, in the liquid phase, are normally preferred.

The copolymers obtained by maintaining, in the liquid reacting phase, a propylene/ethylene molar ratio of at least 4:1, or a butene/ethylene molar ratio of at least 20:1, contain an amount of ethylene not higher than about 75 mole percent, and are amorphous. At ethylene contents much above about 75% by moles, the copolymers exhibit a crystallinity of polyethylenic type. The copolymers may contain as little as 5% by moles of ethylene. However, an ethylene content of at least 20% is indicated for copolymers vulcanizable to commercially acceptable, all-purpose elastomers or synthetic rubbers.

The higher alpha-olefin content of the copolymers can vary from a minimum of 5% by moles to a maximum of 95% by moles. Preferably, it is from 40% to 60% by moles.

The alkadienylnorbornene content of the copolymers can be from 0.1% to 20% by moles and at present is preferably 1 to 5%. The upper limit can be raised but since more than 20%, by moles is not required to facilitate the sulfur-vulcanization, we prefer to avoid using larger amounts of the relatively expensive alkadienylnorbornenes.

Although it is generally preferred for the copolymers to be amorphous, copolymers according to this invention which exhibit a small percent (up to about 10%) of crystallinity when subjected to X-ray examination can also be applied usefully.

The following examples are given to illustrate the invention and are not intended to be limiting.

EXAMPLES

Example 1

The reaction apparatus consists of a 1,100 glass cylinder of 7.5 cm. diameter, equipped with stirrer and gas inlet and outlet tubes, immersed in a bath maintained at the constant temperature of $-20°$ C. The gas inlet tube reaches the bottom of the cylinder and ends in a porous plate (3.5 cm. diameter.).

700 cc. of anhydrous n-heptane, 1 cc. of 5-(3-methyl-1, 4-pentadienyl)-2-norbornene and 0.04 millimoles (mM.) of diethyl zinc are introduced into the reactor, under nitrogen.

Through the gas inlet tube, a gaseous propylene-ethylene mixture at a molar ratio of 3:1 is introduced, and circulated at a rate of 800 Nl./h.

The catalyst is formed in the reaction medium itself, by introducing into the reactor, separately, 1.8 mM. of aluminum diethylmonochloride and 0.25 mM. of vanadium oxytrichloride, each dissolved in 15 cc of anhydrous n-heptane.

The propylene-ethylene gaseous mixture is continuously fed at a rate of 800 Nl./h.

After thirty minutes from the catalyst addition, the reaction is interrupted by adding 20 cc. of methanol containing 0.1 g. of phenylbetanaphthylamine. The product is purified by treatment with hydrochloric acid and water, and coagulated in acetone. 7.3 g. of solid product are obtained, amorphous when subjected to X-ray examination, and completely soluble in boiling n-heptane.

The infrared analysis shows the presence of unsaturations (band at about 6 microns). The ethylene-propylene molar ratio is approximately equal to 1.

100 parts by weight of this terpolymer are mixed in a laboratory roll mixer with 50 parts of HAF carbon black, 1 part of phenylbetanaphthylamine, 2 parts of sulfur, 5 parts of zinc oxide, 1 part of tetramethylthiuram disulphide and 0.5 parts of mercaptobenzothiazole. The mixture is cured in a press for 60 minutes at 150° C.

A vulcanized sheet is obtained; it has the following mechanical characteristics:

Tensile strength—253 kg./cm.$^2$
Elongation at break—460%
Modulus at 300%—130 kg./cm.$^2$

Example 2

2,000 cc. of anhydrous n-heptane, 5 cc. of 5-(3-methyl-1,4-pentadienyl)-2-norbornene and 0.5 mM. of diethyl zinc are introduced into reaction apparatus as described in Example 1, but having a capacity of 3,500 cc. and kept at the constant temperature of $-20°$ C. Through the gas inlet tube a propylene-ethylene gaseous mixture at a molar ratio of 2:1 is injected and circulated at a rate of 900 Nl./h.

The catalyst is prepared in the presence of the reacting monomers, by introducing separately into the reaction vessel a solution consisting of 5 mM. of aluminum diethylmonochloride in 15 cc. of anhydrous n-heptane and a solution of 0.66 mM. of vanadium tetrachloride in 15 cc. of n-heptane.

The propylene-ethylene gaseous mixture is continuously fed and discharged at a rate of 500 Nl./h.

After 14 minutes from the catalyst addition, the reaction is interrupted by adding 20 cc. of methanol containing 0.1 g. of phenylbetanaphthylamine. The product is purified and separated as described in Example 1.

After drying under vacuum, 41 g. of solid product are obtained, amorphous when subjected to X-ray examination, wholly soluble in boiling n-heptane. Infrared analysis shows the presence of trans double bonds (band at 972 cm.$^{-1}$) and of vinyl double bonds (bands at 913 and 922 cm.$^{-1}$). The ethylene-propylene molar ratio is approximately 1.

The terpolymer is vulcanized at 150° C. and for different times using a mix as described in Example 1.

Vulcanized sheets are obtained and found to have the following characteristics:

| Vulcanization time (minutes) | 15 | 30 | 60 | 90 | 120 | 240 |
|---|---|---|---|---|---|---|
| Tensile strength (kg./cm.$^2$) | 240 | 228 | 233 | 233 | 220 | 220 |
| Elongation at break (percent) | 440 | 380 | 380 | 380 | 360 | 340 |
| Modulus at 300% (kg./cm.$^2$) | 134 | 164 | 166 | 166 | 170 | 194 |
| Residual set at break (percent) | 16 | 12 | 12 | 12 | 12 | 10 |

Example 3

Into reaction apparatus as described in Example 2, and kept at the constant temperature of $-20°$ C., there are introduced 2,000 cc. of anhydrous n-heptane, 6 cc. of 5-(3-methyl-1,4-pentadienyl)-2-norbornene and 0.6 mM. of diethyl zinc as regulator of the molecular weight. Through the gas inlet, a propylene/ethylene mixture at molar ratio of 3:1 is injected and circulated at a rate of 1,200 Nl./h.

The catalyst is prepared in the presence of the reacting monomers, by introducing separately into the reactor a solution of 7.5 mM. of aluminum diethylmonochloride in 15 cc. of anhydrous n-heptane and a solution of 1 mM. of vanadium oxytrichloride in 15 cc. of n-heptane. The propylene/ethylene mixture is continuously fed and discharged at a rate of 1,200 Nl./h.

After 40 minutes from the catalyst addition, the reaction is interrupted by adding 20 cc. of methanol containing 0.1 g. of phenylbetanaphthylamine.

The product is purified and separated as described in Example 1.

After drying under vacuum, 46 g. of solid product are obtained. It is amorphous on X-ray examination, looks like an unvulcanized elastomer, and is wholly soluble in boiling n-heptane.

Infrared analysis shows the presence of trans double bonds (bands at 972 cm.$^{-1}$) and of vinyl double bonds (bands at 913 and 922 cm.$^{-1}$).

The terpolymer is vulcanized using the same mix and the modalities of Example 1, to obtain a vulcanized sheet having the following characteristics:

Tensile strength—250 kg./cm.$^2$
Elongation at break—360%
Modulus at 300%—194 kg./cm.$^2$
Residual set after break—12%

EXAMPLE 4

Into reaction apparatus as described in Example 1, and kept at the constant temperature of $-20°$ C., there are introduced 700 cc. of anhydrous n-heptane and 2 cc. of 5-(1,5-hexadienyl)-2-norbornene. Through the gas inlet tube, a propylene-ethylene gaseous mixture at the molar ratio of 4:1 is introduced and circulated at a rate of 500 Nl./h.

The catalyst is prepared in the presence of the reacting monomers, by introducing into the reaction vessel separately a solution of 7.5 mM. of aluminum diethylmonochloride in 15 cc. of anhydrous n-heptane and 1 mM. of vanadium triacetylacetonate dissolved in 30 cc. of anhydrous toluene. The propylene-ethylene mixture is continuously fed and discharged at a rate of 500 Nl./h.

About 90 minutes after addition of the catalyst, the reaction is interrupted by adding 10 cc. of methanol containing 0.1 g. of phenylbetanaphthylamine. The product is purified and isolated as described in Example 1.

After drying under vacuum, 7 g. of a solid product are obtained. It is amorphous on X-ray examination, looks like an unvulcanized elastomer, and is wholly soluble in boiling n-heptane.

Infrared analysis shows the presence of trans double bonds (band at 972 cm.$^{-1}$) and of vinyl double bonds (bands at 913 and 922 cm.$^{-1}$). The molar ratio of ethylene to propylene is approximately equal to 1.

The terpolymer is vulcanized using the mix and modalities of Example 1. A vulcanized sheet is obtained. It has the following characteristics:

Tensile strength—124 kg./cm.$^2$
Elongation at break—380%
Modulus at 300%—96 kg./cm.$^2$
Residual set at break—16%

EXAMPLE 5

Into reaction apparatus as described in Example 2, kept under nitrogen and maintained at the constant temperature of −20° C., there are introduced 2,000 cc. of anhydrous n-heptane, 3 cc. of 5-(1,4-hexadienyl)-2-norbornene and 0.6 mM. of diethyl zinc. Through the gas inlet tube a propylene-ethylene gaseous mixture is introduced at the molar ratio of 3:1 and is circulated at a rate of 1,200 Nl./h.

The catalyst is formed in the reaction medium in the presence of the reacting monomers, by introducing separately into the reaction vessel a solution of 3.8 mM. of aluminum diethylmonochloride in 15 cc. of anhydrous n-heptane and a solution of 0.5 mM. of vanadium oxytrichloride in 15 cc. of anhydrous n-heptane.

The propylene-ethylene gaseous mixture is continuously fed and discharged at the 1,200 Nl./h. rate.

After 12 minutes from the catalyst addition, the reaction is interrupted by adding 20 cc. of methanol containing 0.1 g. of phenylbetanaphthylamine. The product is purified and separated as described in Example 1. After drying under vacuum, 15 g. of solid product are obtained. It appears to be amorphous when subjected to X-ray examination and is wholly soluble in boiling n-heptane. Infrared analysis shows the presence therein of trans double bonds (band at 972 cm.$^{-1}$). The ethylene-propylene molar ratio is approximately 1.

100 parts by weight of this terpolymer are mixed in a laboratory roll-mixer with 80 parts of ISAF carbon black, 55 parts of Flexon oil (oil marketed by Humble Oil Co., containing 45% paraffin, 46% naphthenes, the remaining being aromatic compounds), 1 part of stearic acid, 5 parts of zinc oxide, 1.5 parts of tetramethylthiuram disulphide, 0.175 part of mercaptobenzothiazole and 1.5 parts of sulfur. The mixture is vulcanized in a press for 60 minutes at 150° C., to obtain a vulcanized sheet having the following characteristics:

Tensile strength—156 kg./cm.$^2$
Elongation at break—360%
Modulus at 300%—134 kg./cm.$^2$
Residual set at break—22%

EXAMPLE 6

The reaction apparatus is a one liter glass autoclave, equipped with stirrer and gas inlet tube.

Into the autoclave, kept at the constant temperature of −20° C., there are introduced 500 cc. of liquid propylene, 3 cc. of 5-(1,4-hexadienyl)-2-norbornene and 0.25 mM. of dethyl zinc. Ethylene is introduced until an increase of 0.7 atmosphere in the pressure is reached.

Through two separate dosing-feeders the components of the catalyst are introduced; at first 1.5 mM. of diethyl aluminum monochloride dissolved in 4 cc. of anhydrous n-heptane and then 0.2 mM. of vanadium oxytrichloride dissolved in 4 cc. of anhydrous n-heptane. During the copolymerization the pressure is maintained constant by introducing an additional amount of ethylene corresponding to the amount of ethylene absorbed.

The reaction is interrupted after 37 minutes. The olefins are removed and the solid product is dissolved in cyclohexane, purified in a separator funnel by repeated treatments with dilute hydrochloric acid and then with water; finally, it is coagulated in acetone. After drying under vacuum, 37 g. of solid product, which appears to be amorphous on X-ray examination and which looks like an unvulcanized elastomer, are obtained. Infrared analysis shows the presence therein of trans double bonds (band at 972 cm.$^{-1}$), the ethylene-propylene molar ratio is approximately 1.

The terpolymer is vulcanized using the same mix and the modalities of Example 5. A vulcanized sheet is obtained, showing the following characteristics:

Tensile strength—216 kg./cm.$^2$
Elongatoon at break—350%
Modulus at 300%—170 kg./cm.$^2$
Residual set at break—12%

EXAMPLE 7

Into reaction apparatus as described in Example 2, immersed in a thermostatic bath at −20° C., there are introduced 2,000 cc. of anhydrous n-heptane, 5 cc. of 5-(3,7-octadienyl)-2-norbornene and 0.3 mM. of diethyl zinc. Through the gas inlet tube a propylene-ethylene gaseous mixture at the molar ratio 3:1 is introduced and circulated at a rate of 600 Nl./h.

The catalyst is formed in the reaction medium itself, in the presence of the reacting monomers, by introducing separately into the reactor a solution of 5 mM. of diethyl aluminum monochloride in 10 cc. of anhydrous n-heptane and a solution of 0.66 mM. of vanadium oxytrichloride in 10 cc. of anhydrous n-heptane. The propylene-ethylene gaseous mixture is continuously fed and discharged at a rate of 600 Nl./h.

About 60 minutes after the introduction of the catalyst components, the reaction is interrupted by adding 20 cc. of methanol containing 0.1 g. of phenylbetanaphthylamine. The product is purified and separated as described in Example 1. 18 g. of solid product, which appears to be amorphous when examined by X-ray and which is wholly soluble in boiling n-heptane are obtained. Infrared analysis shows the presence of trans double bonds (band at 972 cm.$^{-1}$) and of double bonds of the vinyl type (bands at 913 and 922 cm.$^{-1}$).

The terpolymer is vulcanized using a mix and modalities as described in Example 1. A vulcanized sheet is obtained, which shows the following characteristics:

Tensile strength—218 kg./cm.$^2$
Elongation at break—430%
Modulus at 300%—138 kg./cm.$^2$
Residual set at break—13%

As will be apparent, changes and variations may be made in details in practicing the invention, without departing from the spirit thereof. Therefore, we intend to include, in the scope of the appended claims, all such modifications in details as may be obvious to those skilled in the art from the description and working examples given herein.

What is claimed is:

1. Substantially linear, amorphous, unsaturated, high molecular weight copolymers of at least one 5-alkadienyl-2-norbornene of the general formula

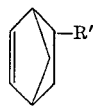

in which R' is a non-conjugated alkadienyl containing from 5 to 9 carbon atoms, with ethylene and at least one higher alpha-olefin of the formula R—CH=CH$_2$ in which R in an alkyl radical containing from 1 to 6 carbon atoms, said copolymers consisting of macromolecules made up of polymerized units of each of the starting monomers.

2. Copolymers according to claim 1, characterized in that the higher alpha-olefin is selected from the group consisting of propylene and butene-1.

3. Copolymers according to claim 2, further characterized in that the alkadienylnorbornene is selected from the group consisting of:

5-(3-methyl-1,4-pentadienyl)-2-norbornene
5-(1,5-hexadienyl)-2-norbornene
5-(1,4-hexadienyl)-2-norbornene and 5-(3,7-octadienyl)-2-norbornene.

4. A process for preparing copolymers according to claim 1, characterized in that a mixture of the monomers is polymerized in contact with a catalyst obtained from (a) vanadium compounds and (b) an aluminum compound selected from the group consisting of hydrides and organometallic compounds of aluminum 5. The process according to claim 4, characterized in that at least one of the catalyst-forming components contains at least one halogen atom and the vanadium compound is hydrocarbon-soluble.

6. The process according to claim 5, further characterized in that the hydrocarbon-soluble vanadium compound is selected from the group consisting of vanadium halides, vanadium oxyhalides, and vanadium compounds in which at least one of the metal valances is satisfied by an oxygen or nitrogen atom bonded to an organic group.

7. The process according to claim 4, characterized in that the vanadium compound is selected from the group consisting of dioxy vanadium chloride, vanadium triacetate, vanadium tribenzoate and vanadium stearate.

8. The process according to claim 4, characterized in that the vanadium compound is halogenated and the aluminum compound is halogen free.

9. The process according to claim 4, characterized in that both the vanadium compound and the aluminum compound are halogenated.

10. The process according to claim 4, characterized in that the vanadium compound is halogen-free and the aluminum compound is halogenated.

11. The process according to claim 4, characterized in that the copolymerization is carried out at temperatures comprised between —80 and +125° C.

12. The process according to claim 4, characterized in that the copolymerization is carried out at temperatures comprised between 0 and —80° C., preferably between —10 and —50° C.

13. The process according to claim 4, characterized in that the catalyst is obtained from a vanadium compound selected from the group consisting of vanadium triacetylacetonate, vanadyl trialcoholates, vanadyl haloalcoholates, and from an aluminum alkylhalide, at temperatures comprised between 0 and 125° C., in the presence of from 0.5 to 1.0 mole per mole of the aluminum alkylhalide, of a complexing agent selected from the group consisting of ethers, thioethers, teritary amines and trisubstituted phosphines containing at least one branched alkyl group or an aromatic group.

14. The process according to claim 4, characterized in that the copolymerization is carried out with the monomers maintained in the liquid state, in the substantial absence of extraneous inert solvent.

15. The process according to claim 4, characterized in that the copolymerization is carried out in a hydrocarbon solvent, optionally halogenated.

16. The process according to claim 4, characterized in that the monomer mixture comprises ethylene and propylene and that a propylene to ethylene molar ratio of at least 4:1 is maintained in the reacting liquid phase.

17. The process according to claim 4, characterized in that the monomer mixture comprises ethylene and butene-1 and a butene-1 to ethylene molar ratio of at least 20:1 is maintained in the reacting liquid phase.

18. A copolymer according to claim 1, sulfur-vulcanized to an elastomer.

19. Manufactured articles obtained by shaping a mass comprising an elastomer according to claim 18.

References Cited

Chemical Abstracts, vol. 64: 6510e, Synthesis of alkenylnorbornenes 1966.

JOSEPH L. SCHOFER, Primary Examiner

R. S. BENJAMIN, Assistant Examiner

U.S. Cl. X.R.

260—666

UNITED STATES PATENT OFFICE
CERTIFICATE OF CORRECTION

Patent No. 3,527,739      Dated September 8, 1970

Inventor(s) Alberto Valvassori, et al

It is certified that error appears in the above-identified patent and that said Letters Patent are hereby corrected as shown below:

Col. 3, line 11, "of" should be - - -or- - -;

line 37, "aluminum chlorotheyl" should be - -aluminum chloroethyl line 43, "of" should be - - -or- - -.

Col. 4, line 25, "inert" should be - - -Inert- - -;

line 35, "hilgh" should be - - -high- - -.

Col. 8, line 4, "dethyl" should be - - -diethyl- - -.

Signed and sealed this 19th day of March 1974.

(SEAL)
Attest:

EDWARD M. FLETCHER, JR.
Attesting Officer

C. MARSHALL DANN
Commissioner of Patents